United States Patent Office 3,429,240
Patented Feb. 25, 1969

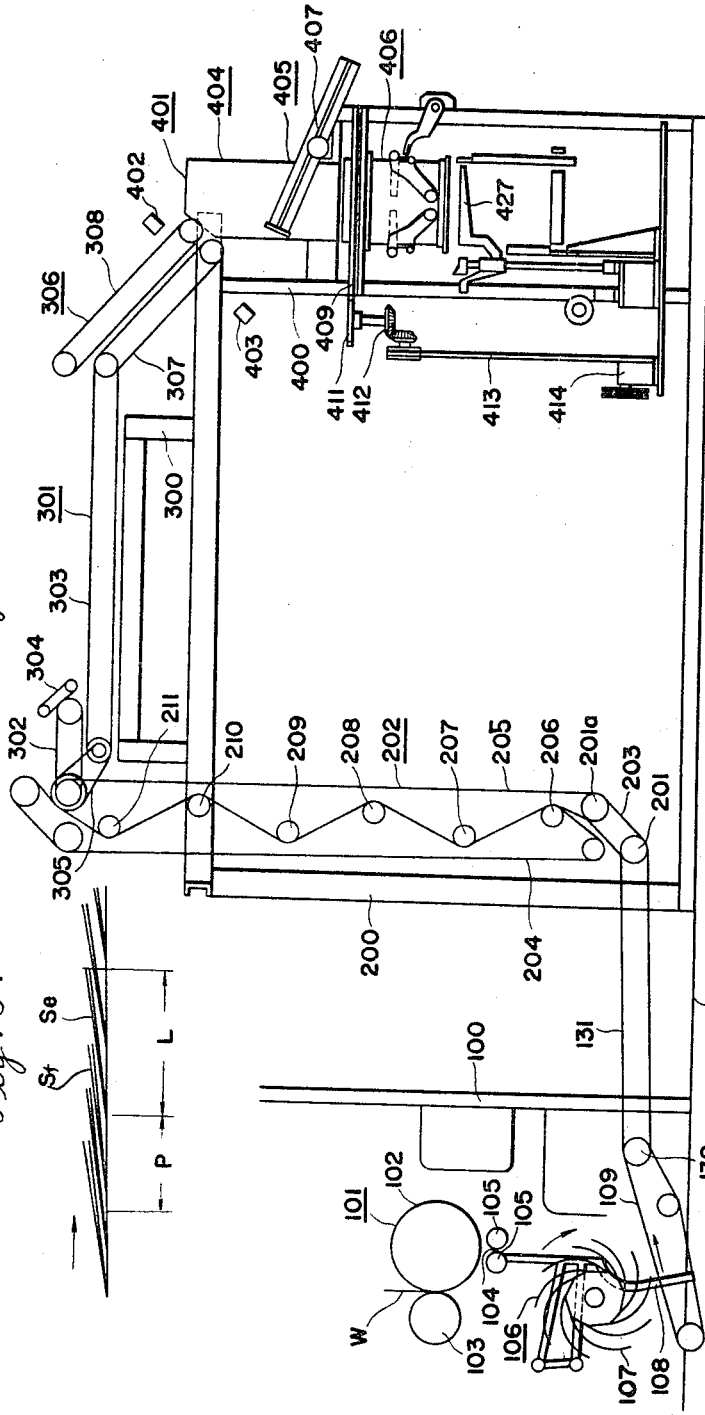

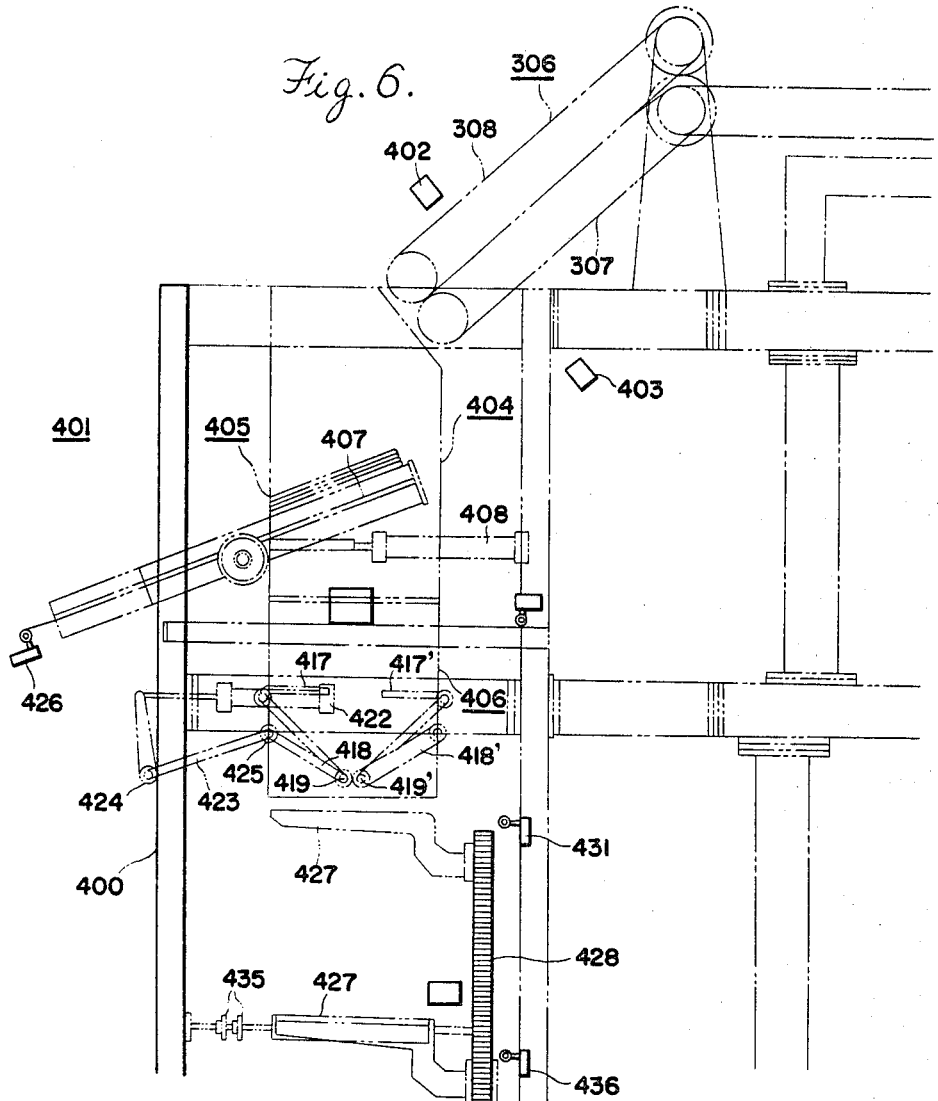

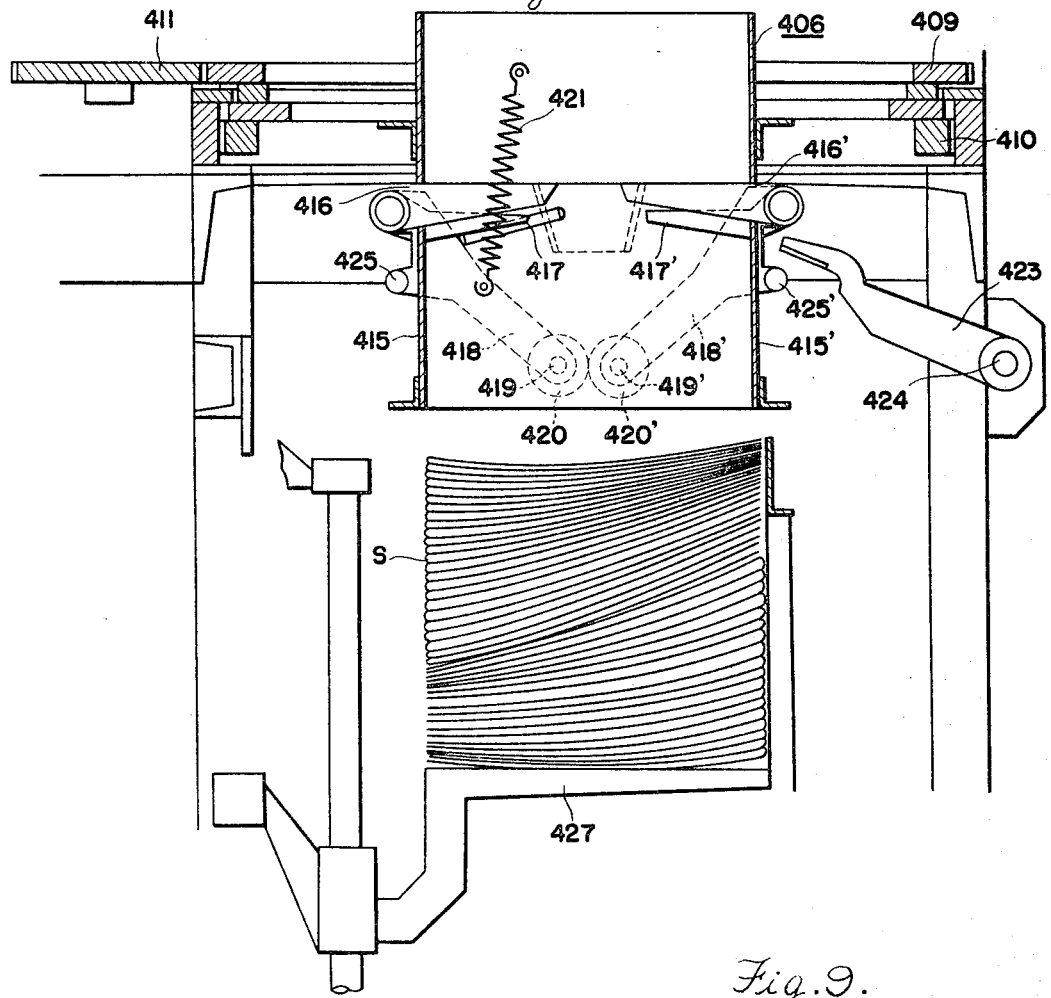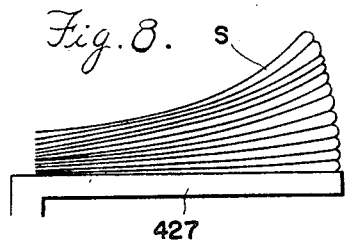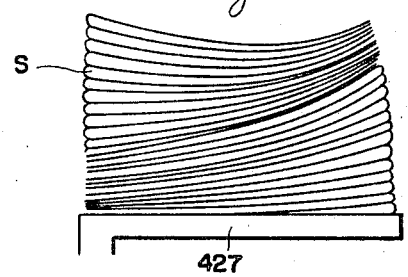

3,429,240
APPARATUS FOR AUTOMATICALLY PROCESSING SECTIONS FROM ROTARY PRESS
Katsumi Kawai, Nagoya, Gohei Suzuki, Tokyo, and Yoshito Kitamura, Kawasaki, Japan, assignors to Ikegai Tekko Kabushiki Kaisha and Kabushiki Kaisha Chubu Nippon Shinbunsha, Tokyo and Nagoya, Japan, respectively
Filed Sept. 25, 1967, Ser. No. 670,314
U.S. Cl. 93—93          4 Claims
Int. Cl. B65h 33/00, 29/34

ABSTRACT OF THE DISCLOSURE

A main guide normally guides sections from a rotating delivery fan on a traveling transport belt to put them in overlapped relation at predetermined equal intervals on the belt. Each time but slightly before the fan effects a predetermined number of complete revolutions an auxiliary guide ascends near the position of the main guide while the main guide swings in the direction of rotation of the fan. Then the sections are guided by the auxiliary guide until the last one in a predetermined number of the sections determined by the predetermined number of complete revolutions of the fan is guided by the auxiliary guide descending. The moved main guide overlaps the next section from the delivery fan on the preceding section on the belt with a predetermined increased interval to mark off a group consisting of the predetermined number of the sections. Then the main guide swings back to its original position. The groups of sections marked off are successively transferred to a second endless belt traveling at such a higher speed that the increased interval provides a space by which one group is separated from the adjacent group of sections. An upper retractable pile board receives one group of sections to form a pile on it. The space followed by the group serves to retract the upper pile board to permit the pile on the latter to fall upon a lower retractable pile board. After rotation through an angle of 180°, the lower pile board receives another pile of sections from the upper board. The superposed piles fall upon a delivery board descending and are transferred to a set of delivery rollers followed by ascending movement of the delivery board.

---

This invention relates in general to an apparatus for automatically processing printed sections successively delivered from a rotary press and especially from a web rotary press, and more particularly to an apparatus for automatically marking off and and piling such sections.

In the conventional type of web rotary presses it has been commonly practiced to use a photocell device or a microswitch to count, one by one, sections continuously delivered from a folder mechanism to produce a control sign each time a predetermined count is reached. The control signal is utilized to operate the associated marking off mechanism to form one group consisting of a predetermined number of the sections. The groups of sections thus formed are successively piled one upon another and then delivered in the form of a large pile.

However, in order to directly count the sections one by one, the number of pages of each section or the thickness thereof is required to exceed a certain limit. This means that the abovementioned process is difficult to be applied to sections each small in number of pages. In fact, such counting operation is extremely unstably performed for sections each having the number of pages equal to eight or less. Further the counting and signalling mechanisms as above described are required to be controlled by complicated controls and therefore they are generally expensive.

An object of the invention is, accordingly, to provide, for use with a rotary press, a new and improved apparatus for automatically marking off and piling printed sections which is relatively simple in construction, cheap in manufacturing and reliable in operation.

Another object of the invention is to provide, for use with a rotary press, a new and improved apparatus for automatically marking off printed sections without the necessity of directly counting the sections one by one.

Still another object of the invention is to provide a new and improved apparatus of the type described in the preceding paragraph and effectively applicable to printed sections small in number of pages.

Briefly the invention accomplishes the above cited objects by the provision of an apparatus for automatically processing sections delivered from a rotary press, comprising movable guide means disposed between a delivery fan device and an endless transport belt to successively guide the sections from the rotating delivery fan device rotating at a predetermined speed onto the transport belt traveling at a predetermined speed to normally form a continuous series of the sections in their overlapped relation having a predetermined spatial spacing between each pair of adjacent sections on the transport belt, means for moving the movable guide means each time but slightly before the delivery fan device effects a predetermined number of complete revolutions to guide the particular section delivered from the delivery fan device onto the traveling belt to overlap it on preceding section with a predetermined spatial spacing larger than the first-mentioned predetermined spatial spacing thereby to marking off the sections into groups each including a predetermined number of the sections, and a second endless transport belt operatively coupled to the first transport belt to successively receive the sections in their overlapped relationship, the second transport belt traveling at such a higher speed that all the spatial spacings increase enough to completely separate each of the groups of sections from the adjacent group by a space formed therebetween through an increase in the second predetermined spatial spacing while the sections of each group is still maintained in their overlapped relationship.

In order to pile the sections in each group, sensing means may be provided for sensing the space between each pair of adjacent groups of sections to provide a control signal and piling means responsive to said control signal to form a pile consisting of a predetermined number of sections thereon.

The invention as to its organization and its mode of operation as well as additional objects and advantages thereof will become more readily apparent from the following detailed description taken in conjunction with the accompanying drawings in which:

FIGURE 1 is a schematic front elevational view of an apparatus constructed in accordance with the principles of the invention with parts omitted;

FIGURES 2a through d are fragmental elevational views of a counting and marking off device illustrated in FIGURE 1 in its different operative positions;

FIGURE 3 is a fragmental schematic view illustrating the manner in which printed sections are carried away by a transport belt;

FIGURE 4 is a fragmental schematic view of a space formed between two adjacent sections carried by a delivery belt to mark off a printed group;

FIGURE 5 is a perspective view of one type of printed section;

FIGURE 6 is a diagrammatic side elevational view of a pile and delivery unit constructed in accordance with the principles of the invention;

FIGURE 7 is a front elevational view in somewhat enlarged scale of one portion of the unit illustrated in FIGURE 6; and FIGURES 8 and 9 are side elevational views of printed sections piled on one another.

Figure 2A:
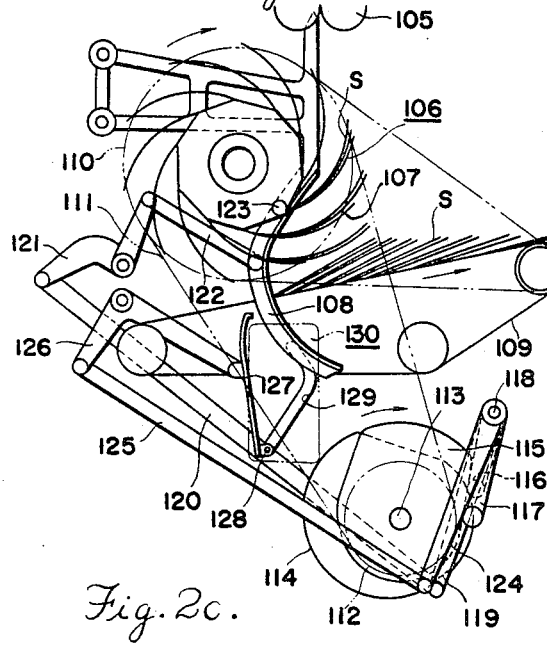

Referring now to the drawings and FIGURE 1 in particular, there is illustrated an apparatus constructed in accordance with the principles of the invention. An arrangement illustrated comprises a portion of web rotary press including a folder unit and a delivery unit separately mounted to frameworks 100, 200 etc. of any suitable cast iron and shaped irons set up on a rigid foundation F made, for example of reinforced concrete. The folder unit generally designated by the reference numeral 101 comprises a folding roll 102 and a cutting roll 103 forming a nip therebetween with at least one serrated knife (not shown) disposed on the periphery of the cutting roll 103.

A printed web W such as a newspaper web having a shape progressively varied into its two folded state (see FIGURE 5) by a former (not shown) disposed above both rolls 102 and 103 passes through the nip between both rolls which ensures that the web W is folded double while at the same time it is cut into folded sheets or sections having a predetermined length. If desired, the section may be in its multi-folded state. The sections then pass through a nip 104 formed between a pair of nipping rolls 105 disposed directly below the folding roll 102 after which they successively fall onto a delivery fan 106 disposed below the nipping rolls 105. As best shown in FIGURE 2a the delivery fan 106 has a plurality of radial curved vanes or blades 107 disposed at substantially equal angular intervals to form a plurality of radial compartments therebetween and is rotatable at a predetermined speed of rotation in the clockwise direction in the direction of the arrow. The delivery fan 106 is shown as including 10 vanes 107 although it may include any desired number of the vanes. The sections successively fall into the radial compartments of the rotating fan 106 one per each compartment and rotate together with the fan.

The components as above described are of the conventional construction. Further in the conventional folder units, a paper guide is fixed at its position designated by the reference numeral 108 in FIGURES 1 and 2a, and the sections positioned on the respective blades 107 are arranged to be engaged at their leading edges by and guided along the paper guide 108 until the sections successively fall onto an endless transport belt 109 continuously moving the predetermined speed in the direction of the arrow shown in each of FIGURES 1 and 2a with the result that they are arranged in overlapped state while their edges contacting the belt are kept at predetermined equal intervals on the belt. In this way the sections are continuously moved toward the succeeding station.

According to the principles of the invention, means for simultaneously counting and marking off the sections are disposed at the stage of dropping the sections from the delivery fan 106 onto the transport belt 109. As shown in FIGURE 2a, a sprocket wheel designated at dot-and-dash line 110 is disposed coaxially with the delivery fan 106 for rotation therewith and has an endless chain 111 spanned between the same and another sprocket wheel 112 which is, in turn, rigidly secured on a cam shaft 113. The numbers of teeth of both sprocket wheels 110 and 112 are determined such that the latter wheel 112 and therefore the cam shaft 113 is rotated at a rate corresponding to a predetermined fraction, in this case a quarter of the number of revolutions of the sprocket wheel 110. In other words, the cam shaft 113 effects one complete revolution per 2½ complete revolutions of the sprocket wheel 110. The cam shaft 113 has fixed thereon a pair of cam plates 114 and 115 against which a pair of cam followers 116 and 117 abut resiliently respectively. Both cam followers 116 and 117 are rockably carried on a common pin 118.

Rotational movement of one of the cam plates 114 causes the associated cam follower 116 and therefore a lever 119 connected thereto to effect rocking movement which is, in turn, transmitted to a main guide member 108 or preferably in the form of a fork through a linkage comprising a connecting rod 120, a lever 121 and a bell crank 122. Unlike the conventional section guide as previously described this forked guide member 108 is pivotably mounted on a pivot pin 123 on a folder bed (not shown) and has its forked portions extending along both sides of each of the delivery fan and belt 106 and 109 respectively.

When the rotational movement of the cam plate 114 is transmitted to the main guide member 108 the latter will effect horizontally rocking movement parallel to the plane of FIGURE 2a about the axis of the pivot pin 123. Here it is noted that the delivery blades and belt 107 and 109 have such widths that the section on either of the blade and belt has both edges slightly projecting beyond both sides of the blades and belt. This permits the forked portions positioned on the delivery blades and belt to impart to the sections being dropped onto the belt a movement as will be described hereinafter.

On the other hand, rotational movement of the other cam plate 115 causes the associated cam follower 117 and hence lever 124 connected thereto to effect rocking movement which is, in turn, transmitted to a movable auxiliary guide member 127 through another linkage comprising a connecting rod 125 and a bell crank 126 whereupon the auxiliary guide member will effect vertically rocking movement parallel to the plane of FIGURE 2a. As shown in FIGURE 2a, the auxiliary guide member 127 preferably in the form of a fork is disposed on the lower portion and in front of the main guide member 108 in the direction of rotation of the delivery fan 106 and is provided at its upper ends with hooks and at its lower end with a pin 128 slidable along a cam slot 129 formed on a cam member 130 rigidly secured to the machine frame (not shown) so as to be convexed away from the auxiliary guide member 127. Therefore it will be apparent that the auxiliary guide member 127 can vertically move while at the same time it horizontally shakes as a result of a combination of the vertically rocking movement of the bell crank 126 with the sliding movement of the pin 128 along the cam slot 129.

In FIGURE 2a, the main guide member 108 is shown as being in its advanced position and the auxiliary guide member 127 is shown as being in its lowermost or inoperative position where it is entirely positioned below the upper conveying run of the transport belt 109. Under these conditions the sections S delivered from the delivery fan 106 rotating at a predetermined speed in the clockwise direction as viewed in FIGURE 2a are successively guided by main guide member 108 in its advanced position until they are successively put in their overlapped relationship onto the transport belt 109 traveling at a predetermined speed with the folded edges of the sections S contacting, at predetermined equal intervals, the belt. That is the sections overlap each other with a predetermined constant pitch on the belt. The sections S are moved toward the right as viewed in FIGURE 2a as the belt 109 is moved.

Figure 2B:
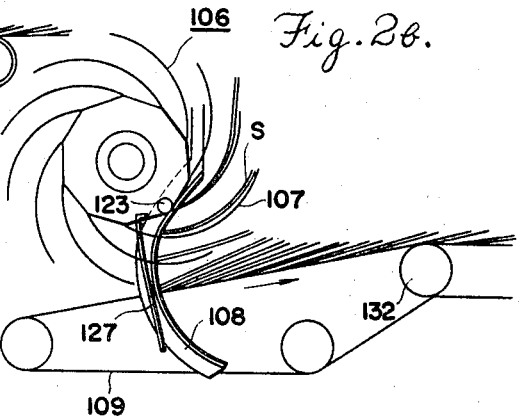

As the cam shaft 113 is rotated the cam follower 117 will reach that point on the periphery of the cam plate 115 farthest remote from the cam shaft 113 whereupon the auxiliary guide member 127 is abruptly raised nearly along the forked guide 108 to reach its uppermost position as shown in FIGURE 2b where the auxiliary guide member superposes the main guide member 108. At that time the sections S still continue to be moved along the main guide member 108 held in its same position as shown in FIGURE 2a.

Figure 2C:
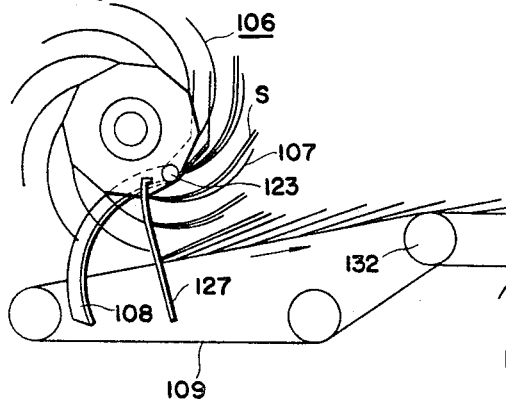

Similarly the cam follower 116 will reach that periphery point on the cam plate 114 farthest remote from the cam shaft 113 whereupon the linkage 120, 121, 122 swings the main guide member 108 from its advanced position as illustrated in FIGURE 2a or b to its retracted position as illustrated in FIGURE 2c. In othe words, the main guide member 108 swings in the direction of rotation of the delivery fan 106 about the axis of the pivot pin 123. It is noted that during this movement of the main guide member 108 the auxiliary guide member 127 remains in its uppermost position as illustrated in FIGURE 2b and serves to guide the sections S from the delivery fan 106 onto the transport belt 109 in the substantially same manner as performed by the main guide member 108 in its advanced position.

Figure 2D:
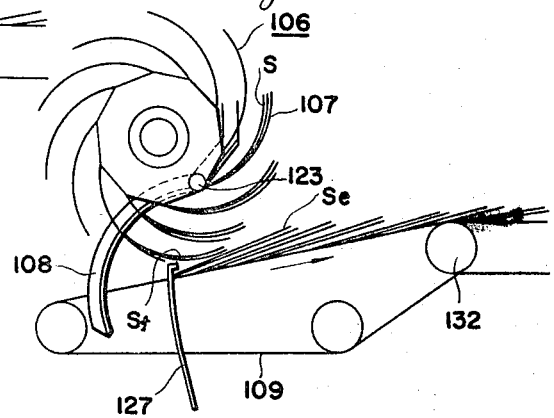

A further rotational movement of the cam shaft 113 causes the auxiliary guide 127 to begin to descend until it temporarily halts at its position as illustrated in FIGURE 2d. However during this descending movement of the auxiliary guide member 127 the main guide 108 remains in its position as illustrated in FIGURE 2c. The cam plate 115 has such a cam profile that the auxiliary guide 127 has its descending speed substantially equal to the descending speed of the sections S delivered from delivery blades 107 due to rotation of the delivery fan 106. Therefore the particular section $S_e$ (see FIGURE 2d) abutting against the auxiliary guide 127 at the instant the latter has begun to descend is guided by the descending guide member 127 and falls onto the transport belt 109 to overlap the preceding section with the predetermined constant spacing or pitch. However the next succeeding section $S_f$ (see FIGURE 2d) passes over the descending guide 127 while being carried by the associated blade 107 until it abuts against the main guide 108 in its retracted position after which it drops onto the transport belt 109 along the guide. Thus it will be appreciated that a pitch or a distance between the two sections $S_e$ and $S_f$ is greater than the normal pitch or distance for the remaining sections carried in overlapped relationship by the transport belt 109.

Then the auxiliary guide member 127 temporarily halted at its position as illustrated in FIGURE 2d is further moved below the upper conveying run of the transport belt 109 to its lowermost position. Thereafter the main guide member 108 is initiated to return back to its advanced position. Once both components 108 and 127 have returned back to their original positions as illustrated in FIGURE 2a the cycle of operation as above described is repeated.

As previously described, the sprocket wheel 112 associated with the delivery fan 106 has the number of teeth equal to predetermined times in this example, 2½ times that of the sprocket wheel 110 associated with the cam shaft 113. Further the delivery fan 106 is shown as including 10 blades. With the figures just specified, the greater pitch such as that formed the adjacent sections $S_e$ and $S_f$ is provided once per 2.5×10=25 sections continuously distributed in overlapped relationship on the transport belt 109. It is to be noted that the greater pitch P should be larger than a half the longitudinal length L of the section as shown in FIGURE 3 for the purpose as will be apparent hereinafter. This is accomplished by properly selecting the magnitude of swinging movement of the main guide 108 and the dimensions of the associated components. Thus the sections S delivered from the delivery fan 106 is transported in the form of a continuity including one greater spatial spacing between two adjacent sections $S_f$ and $S_e$ per 25 sections by the transport belt 109 to the succeeding processing stage.

From the foregoing it will be appreciated that each time but slightly before the delivery fan effects a predetermined number of complete revolutions the main and auxiliary guide members are moved as previously described and that the auxiliary guide member serves to guide the sections from the delivery fan on the transport belt in the same manner as performed by the main guide member until the latter descends while guides the last one in a predetermined number of sections determined by the number of complete revolutions of the fan. The next succeeding section from the delivery fan is guided by the main guide member is its moved position to be overlapped on the preceding section on the belt with the increased interval.

Referring back to FIGURE 1, it is seen that the transport belt 109 is operatively connected to a transfer belt of endless type 131 substantially horizontally traveling in the tensioned state between a pulley 132 which also engages the transport belt 109 and a pulley 201. The transfer belt 131 may be of any suitable construction. For example it may be composed of an array of parallel coils of spring steel wire spanned in tensioned state between the grooved pulleys and it is substantially equal in width to the transport belt 109. An endless belt having such a construction may be called hereinafter a "resilient endless belt."

When the sections successively reach the exit of the transfer belt 131 they are arranged to ascend along a lifter belt unit generally designated by the reference numeral 202.

More specifically, upon reaching the exit end of the transfer belt 131 the sections are successively turned upwardly through engagement with an upwardly tilted endless belt 203 similar to the belt 131 and spanned in tensioned state between the pulley 201 and a pulley 201a. Then the sections are carried between a pair of vertical resilient endless belts 204 and 205 including a plurality of guide pulleys 206, 207, 208, 209, 210 and 211 and disposed in opposed parallel relationship. As both belts 204 and 205 are vertically moved the sections carried and therebetween.

After the sections successively reach the top of the lifter belt unit 202 the same are successively transferred to a marking off or grouping unit generally designated by the reference numeral 301 in which unit the sections are divided into groups each including a predetermined number, in this case twenty five of the sections through spread of the spacing between the adjacent sheets by a factor of a predetermined number to form a space therebetween per 25 sections. Under the previously specified condition that the greater pitch P is greater than a half the length L of the section, the spacing between the sections may be preferably spreaded by a factor of two (2) as will be apparent hereinafter.

The grouping unit 301 comprises a pair of resilient endless belts 302 and 303 horizontally traveling in overlapped relationship one below the other and an intermediate belt of endless resilient type 304 contacting the discharge end of the upper belt 302 and extending obliquely to the lower belt 303. The upper belt 302 is adapted to travel at a linear speed substantially equal to that of the lifter unit 202 while the lower belt 303 has a traveling speed substantially equal to that of the upper belt 302 multiplied by a predetermined number by which the spatial spacings between the sections are to be spreaded. In the example illustrated that number is equal to two as above pointed out. To this end, an endless chain 305 engages the lefthand rolls for the both belts to speed up the belt 303 as required.

After having transferred from the lifter unit 202 to the upper belt 302, the sections are similarly disposed in overlapped relationship on the belt 302 with one greater pitch or spatial spacing appearing for 25 sections and carried to the right as viewed in FIGURE 1 by the belt 302 until they successively abut against the tilted transfer belt 304. Then the sections are successively sandwiched between the discharge end portion of the belt 302 and the belt 304 while at the same time they are downwardly moved without their order and relative spacings disturbed. It is recalled that in this case the lower belt 303 has its traveling speed substantially equal to twice that of the upper belt 302. Therefore it is seen that, after having dropped onto the lower belt 303, the sections will be similarly disposed in their overlapped relationship on the belt 303 but a distance from one section to the next section or the section pitch increases by a factor of two. This is true in the case of the greater pitches appearing once per 25 sections through the cooperation of the main and auxiliary guide members 108 and 127 respectively as previously described in conjunction with FIGURE 2a. More specifically, the original pitch P as provided by the main and auxiliary guide member has met the following inequality $$P > L/2$$

where L represents the longitudinal length of the section. However for the sections on the lower belt 303 this greater pitch P will increase to a value of 2P greater than the longitudinal length L of the sections. This means that a gap or space appears between each pair of adjacent sections bracketing the greater spacing with the length thereof equal to $2P-L$ as shown in FIGURE 4.

Thus it will be appreciated that the sections transported by the belt 303 comprises the groups of 25 sections each separated from the preceding or succeeding group by the space as above described.

The next step is to superpose the sections into piles or stacks.

The discharge end of the lower belt 303 is operatively connected to a transfer belt unit generally designated by the reference numeral 306. The transfer unit 306 includes an endless resilient belt 307 downwardly tilted and serving as a guide for the sections and another endless resilient belt 308 disposed in parallel relationship above the belt 307 and serving lightly to push the sections against the lower belt 307. Accordingly the sections leaving the belt 303 are successively sandwiched between the belts 307 and 308 and passed into a sheet pile and delivery unit generally designated by the reference numeral 401 without their order disturbed.

Referring now to FIGURES 6 and 7, there is illustrated the pile and delivery unit 401 constructed in accordance with the teachings of the invention. The unit 401 comprises an optical-to-electric transducer diagrammatically designated at a pair of small blocks 402 and 403 disposed adjacent the discharge end of the transfer belt unit 306 on both sides respectively for the purpose as will be apparent hereinafter. One of the blocks may be a source of light while the other block is a photosensitive element such as a photocell, a photoconductive element or a phototransistor.

The belts of the transfer unit 306 are composed of an array of parallel coils of any suitable spring steel wire and hence is transmissive to a light from the block 402 or 403 in the absence of the sections on the light path of the transducer 402–403.

As best shown in FIGURE 6, the pile delivery unit 401 comprises a container generally designated by the reference numeral 404. The container 404 includes an upper stationary portion 405 and a lower rotatable portion 406 disposed directly below and in close proximity to the upper portion. Each of the container portions 405 and 406 has a rectangular cross section slightly greater in dimension than the section to be introduced. The upper container portion 405 has an open top to which the transfer unit 306 is operatively coupled, an open bottom, and a tiled retractable pile board 407 normally located between the open top and bottom. The pile board 407 is controlled by a fluid pressure cylinder 408 which is, in turn, controlled by the optical-to-electric transducer 402, 403.

As best shown in FIGURE 7, the lower container portion 406 has fixed to the outer periphery a ring gear 409 carried by a thrust bearing 410 mounted on the machine frame 400 (see FIGURE 1) and meshing a pinion 411. As shown in FIGURE 1, the pinion 411 is operatively coupled through bevel gears 412, a transmission chain 413 and a clutch 414 to an electric motor (not shown). Thus it will be appreciated that when energized, that motor causes rotational movement of the ring gear 409 and therefore of the lower container portion 406 through the above mentioned components 414, 413, 412 and 411. The clutch 414 is of the type controlled with an electric signal applied thereto to permit rotation of the motor to be transmitted to the associated output shaft and automatically disconnected from the motor after a present number of complete revolutions. In the example illustrated, the clutch 414 is adapted to be disconnected from the motor each time the lower container portion 406 has effected a half complete revolution for the purpose as will be apparent hereinafter.

Returning back to FIGURE 7, the lower container portion 406 has also a pair of opposed side walls 415 and 415' provided with transversely elongated openings 416 and 416' respectively. A pair of lower opposed pile boards 417 and 417' in the form of forks are movable toward and away each other through the respective openings 416 and 416' to advance into and retrograde from the interior of the lower container portion 406. More specifically, each of the lower pile boards 417 or 417' is fixed at the outer extremity to a lever 418 or 418' at the adjacent end which lever has the other end pivotably mounted at 419 or 419' on the lower portion of the outer side wall of the container portion 406. Both levers 418 and 418' have rigidly secured at their fulcra 419 and 419' a pair of gears 420 and 420' always meshing each other and one of the levers 418 is normally biased upwardly by the action of a tension spring 421. This ensures that the pair of pile boards 417 and 417' are normally held bilaterally entering into the interior of the lower container portion 406 to close the latter and also that the boards are always operated in symmetrical manner.

In order to move the pair of opposed pile boards 417 and 417' toward and away from each other or to close and open the lower container portion 406, a fluid pressure operated cylinder device 422 (see FIGURE 6) is disposed on the machine frame to rock a lever 423 pivotably mounted at 424 on the machine frame. The lever 423 has a free end portion in the form of a pedal capable of engaging a roller 425 or 425' nested on the lever 418 or 418'. With the lower rotatable container portion 406 in one of its predetermined positions the free end of the lever 423 is arranged to be positioned above one of the rollers 425 or 425' and the cylinder device 422 can operate to downwardly rock the lever 423 to force one of the rollers 425 or 425' downwardly thereby to depress the levers 418 and 418' against the action of the spring 421 to move the pile boards 417 and 417' away from each other resulting in opening of the container portion 406. However when the lever 423 is in its raised position as illustrated in FIGURE 7, the rollers 425 and 425' are prevented from engaging the lever 423 during rotational movement of the lower container portion 406.

The upper pile board 407 is correlated to the lower pile boards 417 and 417' such that when the upper board is open or retracted as will be described hereinafter the lower boards are in their closed position.

It is now assumed that a first group of the sections formed in the manner as previously described by the grouping unit 301 is transferred to the transfer belt unit 306 and the leading section of the group traverses the light path of the optical to electric transducer 402–403. This interrupts the output of the transducer to ensure that the upper pile board 407 is kept in its advanced or closed position. Then the leading section will fall onto the upper pile board 407 in its advanced position. When the succeeding sections of the first group in overlapped relationships are traversing the light path of the transducer, the upper board is maintained in its advanced position to permit the sections to superpose one another thereon.

After the last section of the first group has traversed the light path the space succeeding thereto permits the transducer to provide an output which, in turn, operate the cylinder device 422 to retract the upper pile board whereupon the superposed or piled sections fall from the upper pile board 407 onto the lower pile boards 417 now put in their closed position. The retrogress of the upper board 407 causes closing of the associated limit switch 426 disposed adjacent the end of the stroke of the pile board 407 (see FIGURE 6) to provide an electric signal which is, in turn, supplied to the clutch 414 through a selector switch (not shown). Then the clutch 414 is operated to rotate the lower container portion 406 through an angle of 180 degrees after which the latter stops in its rotated position ready for receiving the succeeding pile. In its rotated position the pile of sections on the lower pile boards 417, 417' has the folded and cut edges reversed in position from those of the succeeding pile formed on the upper pile board 407. It will be apparent that with each section having more than two pages, the folded edge is one about which the section has been lastly folded and the cut edge is one opposed to the folded edge. The upper pile board 407 will return back to its closed position after a predetermined time delay.

The sections of a second group leaving the transfer unit 306 successively fall onto the upper pile board 407 to form a second pile on the latter in the same manner as previously described in conjunction with the first group of sections. Then the upper pile board 407 similarly retracted or open to permit the second pile to fall onto the first pile on the lower closed pile board 417. As above described, the lower container portion 406 and hence the first pile on the lower pile boards 417 already rotated through an angle of 180 degrees whereby the second pile superposes in reversed relationship the first pile as shown in FIGURE 9. Therefore the superposed piles are effectively prevented from collapsing due to the folded side of the pile higher in level than the cut side thereof. For this reason the lower container portion 406 is arranged to be rotated through an angle of 180 degrees after it has received the first pile.

As in the case of the first group of sections the retrogress of the upper pile board 407 causes the limit switch 426 to be again closed to provide an electric signal. Since a selector switch (not shown) associated with the limit switch 426 is arranged to respond to alternate signal applied thereto from the limit switch 426 to actuate the fluid pressure operated cylinder device 422, the electric signal now provided by the limit switch 426 is effective for energizing the cylinder device 422 through the selector switch. When energized, the cylinder device 422 causes the lower pile boards 417 to be retracted or open in the manner as previously described to permit the first and second piles superposed thereon to fall together onto a delivery unit as will be subsequently described. Then the lower pile boards 417 will return back to their closed position after a predetermined time delay as does the upper pile board 407.

As best shown in FIGURE 6, a delivery or taking off board 427 preferably in the form of a fork is horizontally disposed below the lower container portion 406 and secured in cantilever relationship to a vertical rack member 428. The rack member 428 has the lower portion meshing a pinion 429 mounted on shaft 430 which is, in turn, adapted to be driven by the same electric motor (not shown) for driving the lower container portion 406 through a suitable clutch such as an electromagnetic clutch (not shown). Thus it will be seen that the rack member 428 and hence the delivery board 427 can be vertically moved below the lower container portion 406.

Immediately after the lower pile boards 417 have been retracted or opened an upper limit switch 431 disposed adjacent the upper end portion of the rack member 428 is closed to permit the pinion 429 to rotate to move the rack member and therefore the delivery board 427 downwardly. Thus the board 427 is downwardly moved while receiving the falling pile. The board 427 is designed to move downwardly a predetermined distance substantially equal to a thickness of one pile to be delivered at one time. For example, it can move a distance substantially equal to a thickness of a pile consisting of 100 sections.

Under these circumstances, if 25 sections is piled on the upper pile board 407, one pile falling from the lower pile board 417 includes 50 sections. Therefore it is preferable that the taking off board 427 can first move a distance substantially equal to a thickness of a pile of 25 sections and after having temporarily halted, it again moves the same distance until it will reach and stops in its lowermost position. To this end, a control is provided for effecting stepped movement of the delivery board 427.

As shown in FIGURE 6, the control may, for example, comprise a contactless switch including a disc 432 mounted on the shaft 430 and having an axial arm 433a of any suitable ferromagnetic material disposed on the periphery, and an electric winding 434a disposed in such a position that when the disc is rotating the arm 433a passes past in the the close vicinity of the winding to change its inductance. This change in inductance of the winding is effective for interrupting a circuit with the abovementioned electromagnetic clutch to stop the rotation of the pinion 429 and thereby movement of the delivery board 427. Such a contactless switch is of the conventional construction and need not be further described. As a pile of sections generally has its thickness dependent upon the number of piled sections and the quality of the section, a distance through which the delivery board 427 is moved at one time should be controlled in accordance with a thickness of a pile disposed thereon. Therefore a plurality of contactless switches such as above described are mounted in spaced relationship on the shaft 430 as designated by the suffixed characters $b$, $c$ and $d$.

After the delivery board 427 has temporarily halted, the lower pile boards 417 are again retracted to permit the next pile fall upon the pile disposed on the board 427 while at the same time the upper limit switch 431 is again closed downwardly to move the board 427.

Eventually the delivery board 427 reaches its lowermost position as illustrated in FIGURE 7 and also shown at solid line in FIGURE 6 while having a pile disposed thereon as illustrated in FIGURE 7.

As shown in FIGURE 6, a set of delivery rollers 435 disposed adjacent the taking off board 427 at its lowermost position in such a position that the upper surface of the board is substantially equal in level to a plane contacting the upper sides of the rollers. The pile disposed on the board 427 is transferred to the set of delivery roller 435 by any suitable means (not shown) for the succeeding processing operation. Then a lower limit switch 436 disposed adjacent the lowermost position of the delivery board 427 is closed to permit the latter to move upwardly to its initial or uppermost position. Thereafter the process as above described its repeated.

The invention has several advantages. For example, by utilizing mechanical motion of the folder it eliminates the necessity of using any counting mechanism, and is simple in construction, reliable in operation and reduced in failure. It can be effectively applied to sections each consisting of small pages because the marking off mechanism is effectively operated regardless of the number of pages involved in each section. Also the use of the vertically movable delivery board reduces a distance through which the sections fall resulting in a large number of sections piled in alignment and decreased in collapse of the pile.

While the invention has been illustrated and described in conjunction with a preferred embodiment thereof it is to be understood that numerous changes and modifications may be resorted to without departing from the spirit and scope of the invention. For example, the cam shaft 113 may be driven by a gearing rather than the chain means. Also instead of the cam means a fluid pressure operated device or devices may be used to mark off the sections on the belt 109. Further photocell means may substitute any or all of the microswitches as previously described. In addition, the cams 114 and 115 may vary in number of revolutions per unit time to mark off the sections into groups each consisting any desired number of the sections. The photocell device 402–403 may be arranged to respond to every other or third spatial space between two groups of sections to provide an output whereby a larger number of the sections can be piled on the upper pile board 407. Also the sections may be arranged on the belt 109 such that the folded edges thereof provide the leading edge of traveling sections.

What we claim is:

1. In an apparatus for automatically processing sections delivered from a rotary press, the combination of movable guide means disposed between a delivery fan device and an endless transport belt to successively guide the sections from the rotating delivery fan device rotating at a predetermined speed onto the transport means traveling at a predetermined speed to normally form a continuous series of the sections in their overlapped relation having a predetermined spatial spacing between each pair of adjacent sections on the transport belt, means for moving said movable guide means each time but slightly before the delivery fan device effects a predetermined number of complete revolutions to guide the particular section delivered from the delivery fan device onto the traveling belt to overlap it on preceding section with a predetermined spatial spacing larger than the first-mentioned predetermined spatial spacing thereby to marking off the sections into groups each including a predetermined number of the sections, and a second endless transport belt operatively coupled to said first transport belt to successively receive the sections in their overlapped relationship, said second transport belt traveling at such a higher speed that all the spatial spacings increase enough to completely separate each of the groups of sections from the adjacent group by a space formed therebetween through an increase in the second predetermined spatial spacing while the sections of each group is still maintained in their overlapped relationship.

2. A processing apparatus as claimed in claim 1, wherein said movable guide means comprises a main rockable guide member disposed between said delivery fan device and said first transport belt and having two operative positions, and an auxiliary guide member disposed adjacent said main guide member in one of its operative positions and having its operative and inoperative positions, the arrangement being such that said main guide member in said one of its operative positions normally guides the sections from said delivery fan device onto said first transport belt to form the series of sections in their overlapped relationship having the first-mentioned predetermined spatial spacing on the belt while said auxiliary guide member is maintained in its inoperative position, slightly before each of a predetermined number of complete revolutions effected by said delivery fan device, said auxiliary guide member moves upward from its inoperative position to its operative position while said main guide member swings from said one to the other operative position in the direction of rotation of said delivery fan device thereby to distribute the sections in their overlapped relationship on the belt until the last one in a predetermined number of sections is guided by said auxiliary guide member descending to its inoperative position and that said main guide member in its other operative position overlap the next succeeding section from said delivery fan device upon the preceding section on the transport belt with a predetermined increased spatial spacing to mark off one group consisting of the predetermined number of sections, after which said main guide member returns back to its one operative position.

3. A processing apparatus as claimed in claim 1, comprising means for sensing said space between each pair of adjacent groups of sections to provide a control signal and piling means responsive to said control signal to form a pile consisting of a predetermined number of sections.

4. A processing apparatus as claimed in claim 1, comprising means for sensing said space between each pair of adjacent groups of sections, a first retractable pile board member having an advanced position where it receives one group of sections to form a pile thereon and a retracted position, a second retractable pile board member disposed below said first pile board member and having an advanced position and a retracted position, said first pile board member responding to said control signal to move to its retracted position to permit the pile thereon to fall onto said second pile board member in its advanced position, means for rotating said second pile board means through an angle of 180 degrees, a delivery board member disposed below said second pile board member movably in the vertical direction, the arrangement being such that said second pile board member is rotated through an angle of 180 degrees after it has received one pile of sections thereon and then again receives a second pile of sections or said one pile and a pair of piles superposing each other are permitted to fall onto said delivery board member descending upon retracting said second pile board member.

References Cited
UNITED STATES PATENTS

| | | | |
|---|---|---|---|
| 3,006,258 | 10/1961 | Jochem | 93—93 |
| 3,119,609 | 1/1964 | Porter | 93—93 X |
| 3,292,505 | 12/1966 | Wiseman | 93—93 |

BERNARD STICKNEY, *Primary Examiner.*

U.S. Cl. X.R.

271—71